United States Patent [19]

Fukushima et al.

[11] Patent Number: 5,183,870
[45] Date of Patent: Feb. 2, 1993

[54] COMPOSITION FOR PLASTIC LENSES

[75] Inventors: Hiroshi Fukushima; Akira Motonaga; Eriko Suda, all of Nagoya; Mikito Nakajima, Suwa; Katsuyoshi Takeshita, Suwa; Yusuke Kutsukake, Suwa, all of Japan

[73] Assignees: Mitsubishi Rayon Co., Ltd; Seiko Epson Corporation, both of Tokyo, Japan

[21] Appl. No.: 651,945

[22] Filed: Feb. 7, 1991

[30] Foreign Application Priority Data

| Feb. 8, 1990 | [JP] | Japan | 2-27118 |
| Feb. 19, 1990 | [JP] | Japan | 2-36148 |
| Jul. 5, 1990 | [JP] | Japan | 2-176223 |
| Jul. 5, 1990 | [JP] | Japan | 2-176224 |

[51] Int. Cl.$^5$ ............................................. C08F 24/00
[52] U.S. Cl. .................................. 526/273; 526/301; 526/318; 526/318.2; 526/320
[58] Field of Search ............... 526/273, 318.2, 318, 526/301

[56] References Cited

U.S. PATENT DOCUMENTS

| 3,876,581 | 4/1975 | Neogi | 260/29.7 |
| 3,988,274 | 10/1976 | Masuhara et al. | 526/318 |
| 4,618,658 | 10/1986 | Hefner, Jr. et al. | 526/273 |

FOREIGN PATENT DOCUMENTS

| 0269366 | 1/1988 | European Pat. Off. |
| 0430209 | 5/1991 | European Pat. Off. |
| 0109073 | 5/1984 | United Kingdom | 526/273 |

OTHER PUBLICATIONS

Patent Abstracts of Japan, vol. 11, No. 69(C-407) [2516], Mar. 3, 1987, & JP-A-61-228007, Oct. 11, 1986, M. Iwasaki, et al., "Photo-Polymerizable Composition".

Patent Abstracts of Japan, vol. 10, No. 172 (C-354) [2228], Jun. 18, 1986 & JP-A-61-021119, Jan. 29, 1986, S. Takeyama, et al., "Photosetting Resin Composition".

*Primary Examiner*—Joseph L. Schofer
*Assistant Examiner*—Alex H. Walker
*Attorney, Agent, or Firm*—Oblon, Spivak, McClelland, Maier & Neustadt

[57] ABSTRACT

Disclosed is a composition comprising
(A) 10 to 60 parts by weight of a polybutylene glycol di(meth)acrylate represented by the general formula (I):

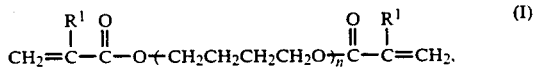

(B) 20 to 80 parts by weight of a specific urethane poly(meth)acrylate or epoxy poly(meth)acrylate,
(C) 5 to 60 parts by weight of a specific mono(meth)acrylate, and
(D) 0 to 60 parts by weight of a compound having at least one polymerizable double bond in the molecule, with the total amount of components (A), (B), (C) and (D) being 100 parts by weight. This composition is suitable for the making of plastic lenses because of its excellent properties such as high thermal resistance, high impact resistance, good dyeability, low water absorption and high surface accuracy.

8 Claims, No Drawings

COMPOSITION FOR PLASTIC LENSES

BACKGROUND OF THE INVENTION

1. Field of the Invention

This invention relates to compositions useful in the making of plastic lenses having high thermal resistance, high impact resistance, low water absorption and good moldability.

2. Description of the Prior Art

Because of their unique properties such as easy moldability and light weight, plastic lenses have come to be widely used in optical products. In particular, it is desirable that eyeglasses are light in weight. In recent years, therefore, a resin comprising diethylene glycol bisallyl carbonate (commercially available under the tradename of CR-39 from PPG Co., Ltd.) is being used as the chief material for the making of plastic eyeglasses.

However, high refractive indices and high productivity have lately come to be required of plastic lenses. As a result, plastic lenses made by using various monomers and oligomers in place of CR-39 have been proposed.

Important properties required of plastic lenses include high thermal resistance, high impact resistance, low water absorption, molding surface accuracy, dyeability and the like. Conventionally, monomers and oligomers capable of imparting highly elastic structures such as the ether, urethane, ester and carbonate linkages have been used as components for improving impact resistance and dyeability. Among others, the use of low-viscosity di(meth)acrylates having an ether linkage in the molecule and capable of improving casting workability has been proposed (Japanese Patent Laid-Open No. 16813/'89).

Typical examples of such di(meth)acrylate monomers capable of producing a polyether structure are polyethylene glycol di(meth)acrylates and polypropylene glycol di(meth)acrylates. When these monomers are used, the impact resistance and dyeability of the resulting lenses are improved in proportion to the increasing number of repeating ethylene oxide or propylene oxide units.

On the other hand, however, this approach has posed a problem concerning the retention of high thermal resistance, low water absorption and high surface accuracy which are required of lenses. In order to achieve high thermal resistance and low water absorption, it generally suffices to impart low water absorption properties to the polymer. Improvement of the low water absorption properties of a polymer has been achieved by introducing a hydrocarbon chain, aromatic ring or halogen atom into the molecule thereof (Japanese Patent Laid-Open No. 66401/'82). This method brings about high thermal resistance and low water absorption, but causes a reduction in impact resistance and dyeability.

In order to solve the above-described problems, the present inventors have made intensive studies and have found that a certain polybutylene glycol dimethacrylate is a monomer capable of producing a polymer having a well-balanced combination of impact resistance and water absorption, and a certain composition containing this monomer can yield a product having high impact resistance and low water absorption. Moreover, it has also been found that, by applying this composition to the making of plastic lenses, there can be obtained plastic lenses having high impact resistance, good dyeability, high thermal resistance and low water absorption.

However, this composition fails to achieve satisfactorily high surface accuracy (i.e., coincidence between the lens curvature and the design curvature) which is a property required of lenses.

The present inventors continued to make intensive studies and have found a composition containing an urethane poly(meth)acrylate or an epoxy poly(meth)acrylate for improving thermal resistance, a polybutylene glycol di(meth)acrylate for improving impact resistance, low water absorption and dyeability, and a mono(meth)acrylate of alicyclic hydrocarbon monoalcohol or aromatic monoalcohol for improving surface accuracy which can yield excellent lens products. Accordingly, the present inventors completed the present invention.

SUMMARY OF THE INVENTION

It is an object of the present invention to provide a composition for plastic lenses which can be polymerized with high-energy radiation in a short period of time to yield plastic lenses having high thermal resistance, high impact resistance, good dyeability and low water absorption.

It is another object of the present invention to provide a composition for plastic lenses which can yield plastic lenses (in particular, concave lenses) having high surface accuracy.

The above objects of the present invention are accomplished by providing a composition for plastic lenses which comprises (A) 10 to 60 parts by weight of a polybutylene glycol di(meth)acrylate represented by the general formula (I):

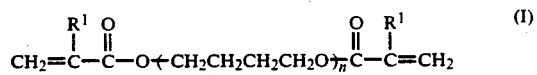

where $R^1$ is hydrogen or methyl, and n is an integer of 5 to 16;

(B) 20 to 80 parts by weight of at least one compound selected from the group consisting of a urethane poly(meth)acrylate having two or more (meth)acryloyloxy groups in the molecule, and an epoxy poly(meth)acrylate having two or more (meth)acryloyloxy groups in the molecule;

(C) 5 to 60 parts by weight of at least one mono(meth)acrylate selected from the group consisting of compounds represented by the general formulae (II), (III), (IV) and (V):

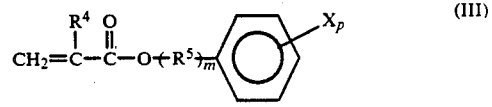

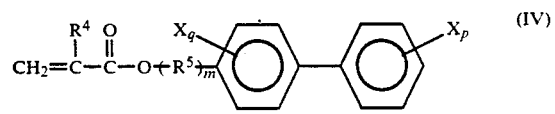

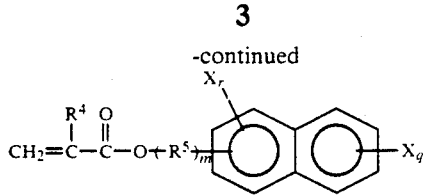

wherein $R^2$ is hydrogen or methyl, $R^3$ is an alicyclic hydrocarbon radical having 5 to 16 carbon atoms, $R^4$ is hydrogen or methyl, $R^5$ is $-CH_2-$, $-CH_2CH_2-O-$,

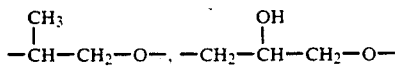

or $-CH_2CH_2CH_2CH_2-O-$, X is chlorine, bromine or iodine, m is an integer of 0 to 3, p is an integer of 0 to 5, q is an integer of 0 to 4, and r is an integer of 0 to 3; and (D) 0 to 60 parts by weight of a compound having at least one polymerizable double bond in the molecule, with the total amount of components (A), (B), (C) and (D) being 100 parts by weight.

In the compositions of the present invention, component (A) has a favorable effect chiefly on impact resistance, water absorption and dyeability, component (B) has a favorable effect chiefly on thermal resistance, and component (C) has a favorable effect chiefly on surface accuracy. As a result of the cooperation of these effects, the compositions of the present invention are very excellent compositions for plastic lenses from a generalized point of view.

DESCRIPTION OF THE PREFERRED EMBODIMENTS

The polybutylene glycol di(meth)acrylate (A) of the general formula (I), which constitutes a first component in the compositions of the present invention, is a polybutylene glycol having a degree of polymerization of 5 to 16 and whose ends are terminated with two acrylic acid or methacrylic acid molecules. As used herein, the term "degree of polymerization" means the number (n) of repeating units represented by the formula $-(CH_2CH_2CH_2CH_2O)-$. If the degree of polymerization is less than 5, sufficient flexibility will not be obtained. If it is greater than 16, the resulting polymer will show an increase in water absorption and a reduction in cross-linking density, resulting in reduced hardness and thermal resistance. Moreover, the monomer will show an increase in viscosity, resulting in reduced casting workability. Preferably, the degree of polymerization is in the range of 7 to 12. It is to be understood that, since a polybutylene glycol dimethacrylate is generally a mixture of polymeric species having normally distributed degrees of polymerization, the degree of polymerization (n) used herein means a median.

The polybutylene glycol di(meth)acrylates which are useful in the compositions of the present invention can readily be prepared by the condensation reaction of a polybutylene glycol (obtained, for example, by the ring opening polymerization of tetrahydrofuran) with acrylic acid or methacrylic acid, or by the ester interchange reaction of a polybutylene glycol with methyl acrylate or methyl methacrylate. However, the use of an ester interchange reaction is preferred because it produces a colorless and transparent monomer.

Typical examples of the polybutylene glycol di(meth)acrylate (A) include heptabutylene glycol di(meth)acrylate, octabutylene glycol di(meth)acrylate, nonabutylene glycol di(meth)acrylate, decabutylene glycol di(meth)acrylate, undecabutylene glycol di(meth)acrylate and dodecabutylene glycol di(meth)acrylate.

The compound (B) constituting a second component in the compositions of the present invention is selected from the group consisting of a urethane poly(meth)acrylate having two or more (meth)acryloyloxy groups in the molecule, and an epoxy poly(meth)acrylate having two or more (meth)acryloyloxy groups in the molecule.

The compound (B) constituting the second component is used to improve the thermal resistance of the resulting lenses, because lenses formed by using only the polybutylene di(meth)acrylate (A) constituting the first component will fail to have satisfactory thermal resistance.

Useful urethane poly(meth)acrylates having two or more (meth)acryloyloxy groups in the molecule, which can be used as the compound (B), include products obtained by the urethane-forming reaction of a (meth)acrylate containing a hydroxyl group with a polyisocyanate having two or more isocyanate groups in the molecule.

Specific examples of the polyisocyanate having two or more isocyanate groups in the molecule include aliphatic, aromatic and alicyclic polyisocyanates such as tetramethylene diisocyanate, hexamethylene diisocyanate, 2,2,4-trimethylhexamethylene diisocyanate, dimer acid diisocyanate, cyclohexane diisocyanate, isophorone diisocyanate, tolylene diisocyanate, xylylene diisocyanate, 1,3-bis($\alpha,\alpha$-dimethylisocyanatomethyl)benzene, diphenylmethane diisocyanate, m-phenylene diisocyanate, dicyclohexylmethane diisocyanate, naphthalene diisocyanate and biphenyl diisocyanate. There can also be used those compounds having two or more isocyanate groups in the molecule which are obtained by reacting such a polyisocyanate with a compound having at least two active hydrogen atoms arising from the amino group, the hydroxyl group, the carboxyl group, water or the like; the trimers, tetramers and pentamers of the foregoing diisocyanates; and the like.

The hydroxyl-containing (meth)acrylates which can be reacted with the above-described polyisocyanates include hydroxyl-containing (meth)acrylates such as 2-hydroxyethyl (meth)acrylate, 2-hydroxypropyl (meth)acrylate, 2-hydroxybutyl (meth)acrylate, and 4-hydroxybutyl (meth)acrylate; the adducts of (meth)acrylic acid with monoepoxy compounds such as butyl glycidyl ether, 2-ethylhexyl glycidyl ether, phenyl glycidyl ether and glycidyl methacrylate; mono(meth)acrylic esters of polyethylene glycol, polypropylene glycol and the like; mono(meth)acrylic esters of polycaprolactonediols (n=1 to 5); and the like.

The addition reaction of a polyisocyanate with a hydroxyl-containing (meth)acrylate can be carried out according to any conventional procedure. For Example, this can be done by adding a mixture of a hydroxyl-containing (meth)acrylate and a catalyst (e.g., di-n-butyltin laurate) dropwise to a polyisocyanate at a temperature of 50° to 90° C.

In the compositions of the present invention, the above-defined urethane poly(meth)acrylates may be used alone or in admixture of two or more. However, for the reason that the plastic lenses formed by curing are colorless and transparent and have high thermal resistance, it is especially preferable to use a urethane poly(meth)acrylate which is an adduct of 2-hydroxyethyl (meth)acrylate or 2-hydroxypropyl (meth)acrylate with isophorone diisocyanate, 2,2,4-trimethylhexamethylene diisocyanate, dicyclohexylmethane diisocyanate, xylylene diisocyanate, 1,3-bis(α,α-dimethylisocyanatomethyl)benzene, tolylene diisocyanate or naphthalene diisocyanate.

Useful epoxy poly(meth)acrylates having two or more (meth)acryloyloxy groups in the molecule, which can be used as the compound (B), include products obtained by the glycidyl ring opening reaction of an epoxy compound having two or more glycidyl groups in the molecule with (meth)acrylic acid or a compound having (meth)acryloyloxy and carboxyl groups in the molecule.

The epoxy compounds (i.e., the Epoxy compounds having two or more glycidyl groups in the molecule) which can be used in the above-described ring opening reaction to form epoxy poly(meth)acrylates include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycodl diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalate, trimethylolpropane diglycidyl ether, trimethylolpropane triglycidyl ether, glycerol diglycidyl ether, glycerol triglycidyl ether, diglycerol triglycidyl ether, pentaerythritol diglycidyl ether, pentaerythritol tetraglycidyl ether, dipentaerythritol pentaglycidyl ether, dipentaerythritol hexaglycidyl ether, sorbitol tetraglycidyl ether, diglycidyl ether of tris(2-hydroxyethyl) isocyanurate, and triglycidyl ether of tris(2-hydyroxyethyl) isocyanurate; alicyclic epoxy compounds such as isophoronediol diglycidyl ether, 1,4-bis(hydroxymethyl)cyclohexane diglycidyl ether and bis-(4-glycidyloxycyclohexyl)propane, aromatic epoxy compounds such as resorcinol diglycidyl ether, 2,2-bis(4-glycidyloxyphenyl) propane (obtained by the condensation of bisphenol A with epichlorohydrin), 2,2-bis (4-glycidyloxyphenyl) propane (obtained by the condensation of bisphenol F with epichlorohydrin), 2,2-bis(4-glycidyloxyphenyl)sulfane (obtained by the condensation of bisphenol S with epichlorohydrin), 2,2-bis(4-glycidyloxy-3,5-dibromophenyl)propane, the condensation products of bis(3,5-dimethyl-4-hydroxyphenyl)sulfone, bis(3-methyl-4-hydroxyphenyl)sulfone or bis(3-phenyl-4-hydroxyphenyl)sulfone with epichlorohydrin, the condensation product of 2,6-xylenol dimer with epichlorohydrin, diglycidyl o-phthalate, phenolic novolak polyglycidyl ether and cresylic novolak polyglycidyl ether; and the like.

The compounds which can be reacted with the above-described epoxy compounds include acrylic acid, methacrylic acid, carboxyl-containing (meth)acrylates obtained by the reaction of hydroxyethyl (meth)acrylate with an acid anhydride such as o-phthalic anhydride, and carboxyl-containing (meth)acrylates obtained by the reaction of glycidyl (meth)acrylate with a compound having two or more carboxyl groups in the molecule, such as adipic acid.

The reaction of an epoxy compound with a carboxyl-containing (meth)acrylate can be carried out, for example, by mixing both reactants, adding thereto a catalyst comprising a tertiary amino compound (e.g., dimethylaminoethyl- methacrylate) or a quaternary amine salt (e.g., benzyltrimethylammonium chloride), and heating the resulting reaction mixture at a temperature of 60° to 110° C.

In the compositions of the present invention, the above-defined epoxy poly(meth)acrylates may be used alone or in admixture of two or more. However, for the reason that the plastic lenses formed by curing are colorless and transparent and have high thermal resistance, it is especially preferable to use an epoxy poly(meth)acrylate which is a reaction product of acrylic acid or methacrylic acid with 1,6-hexanediol diglycidyl ether, diethylene glycol diglycidyl ether, trimethylolpropane diglycidyl ether, trimethylolpropane triglycidyl ether, glycerol diglycidyl ether, glycerol triglycidyl ether, triglycidyl ether of tris(2-hydroxyethyl) isocyanurate, 2,2-bis(4-glycidyloxycyclohexyl)propane, 2,2-bis(4-glycidyloxyphenyl)propane, 2,2-bis(4-glycidyloxyphenyl)sulfone or 2,2-bis(4-glycidyloxy-3,5-dibromophenyl)propane.

The mono(meth)acrylate (C) constituting a third component in the compositions of the present invention is selected from the group consisting of compounds represented by the general formulae (II), (III), (IV) and (V). This mono(meth)acrylate (C) is used to improve the surface accuracy of the resulting lenses, because lenses formed by using only the first and second components will fail to have satisfactory surface accuracy.

The compounds which can be used as the mono(meth)acrylate (C) include ones represented by the general formula (II):

$$CH_2=C(R^2)-\overset{O}{\overset{\|}{C}}-O-R^3 \qquad (II)$$

where $R^2$ is hydrogen or methyl, and $R^3$ is an alicyclic hydrocarbon radical having 5 to 16 carbon atoms. Specific examples of these compounds are cyclopentyl (meth)acrylate, cyclohexyl (meth)acrylate, methylcyclohexyl (meth)acrylate, trimethylcyclohexyl (meth)acrylate, norbornyl (meth)acrylate, isobornyl (meth)acrylate, adamantyl (meth)acrylate, dicyclopentenyl (meth)acrylate and tricyclo[5.2.1.0$^{2,6}$]decan-8-yl (meth)acrylate. These compounds may be used alone or in admixture of two or more. Especially preferred are cyclohexyl (meth)acrylate, norbornyl (meth)acrylate, isobornyl (meth)acrylate, adamantyl (meth)acrylate and tricyclo[5.2.1.0$^{2,6}$]-decan-8-yl (meth)acrylate.

The compounds which can be used as the mono(meth)acrylate (C) also include ones represented by the general formulae (III), (IV) and (V):

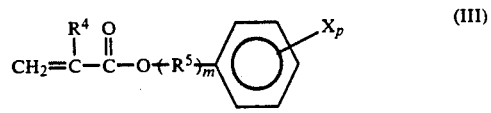

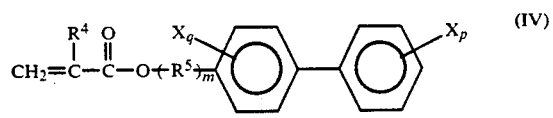

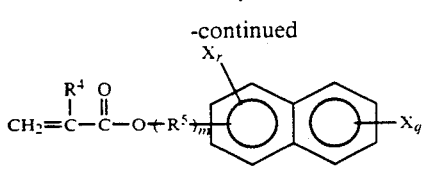

where R⁴ is hydrogen or methyl, R⁵ is —CH₂—, —CH₂CH₂—O—,

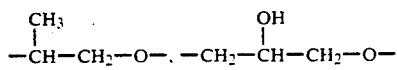

or —CH₂CH₂CH₂CH₂—O—, X is chlorine, bromine or iodine, m is an integer of 0 to 3, p is an integer of 0 to 5, q is an integer of 0 to 4, and r is an integer of 0 to 3. These compounds are mono(meth)acrylates of monoalcohols having an aromatic hydrocarbon radical or a halogenated aromatic hydrocarbon radical.

These compounds can be prepared by reacting (meth)acrylic acid with a monoalcohol as described above or a product obtained by the ring opening addition of ethylene oxide, propylene oxide or tetrahydrofuran to a monoalcohol as described above.

Specific examples of the compounds represented by the general formulae (III), (IV) and (V) include phenyl (meth)acrylate, benzyl (meth)acrylate, phenoxyethyl (meth)acrylate, phenoxy-2-methyl (meth)acrylate, 3-phenoxy-2-hydroxypropyl (meth)acrylate, phenyl-di(oxyethyl) (meth)acrylate, phenyl-tri(oxyethyl) (meth)acrylate, phenyl-di(2-methyloxyethyl) (meth)acrylate, phenyl-tri(2-methyloxyethyl) (meth)acrylate, phenoxybutyl (meth)acrylate, phenyl-di(oxybutyl) (meth)acrylate, phenyl-tri(oxybutyl) (meth)acrylate, 2-phenylphenyl (meth)acrylate, 4-phenylphenyl (meth)acrylate, 2-phenylphenoxyethyl (meth)acrylate, 4-phenylphenoxyethyl (meth)acrylate, 2-phenylphenyl-2-methoxyethyl (meth)acrylate, 4-phenylphenyl-2-methyloxyethyl (meth)acrylate, 3-(2-phenylphenyl)-2-hydroxypropyl (meth)acrylate, 3-(4-phenylphenyl)-2-hydroxypropyl (meth)acrylate, 1-naphthyl (meth)acrylate, 2-naphthyl (meth)acrylate, 1-naphthyloxyethyl (meth)acrylate, 2-naphthyloxyethyl (meth)acrylate, 1-naphthyl-di(oxyethyl) (meth)acrylate, 2-naphthyl-di(oxyethyl) (meth)acrylate, 1-naphthyl-2-methyloxyethyl (meth)acrylate, 2-naphthyl-2-methyloxyethyl (meth)acrylate, 3-(1-naphthyl)-2-hydroxypropyl (meth)acrylate, 3-(2-naphthyl)-2-hydroxypropyl (meth)acrylate, 2-bromophenyl (meth)acrylate, 4-bromophenyl (meth)acrylate, 2,4-dibromophenyl (meth)acrylate, 2,4,6-tribromophenyl (meth)acrylate, 2,3,4,5,6-pentabromophenyl (meth)acrylate, 2,4-dibromophenoxyethyl (meth)acrylate, 2,4,6-tribromophenyl-di(oxyethyl) (meth)acrylate, 2,4,6-tribromophenyl-2-methyloxyethyl (meth)acrylate, 2-bromobenzyl (meth)acrylate, 4-bromobenzyl (meth)acrylate, 2,4-dibromobenzyl (meth)acrylate, 2,4,6-tribromobenzyl (meth)acrylate, 2,3,4,5,6,-pentabromobenzyl (meth)acrylate, 2-chlorophenyl (meth)acrylate, 4-chlorophenyl (meth)acrylate, 2,4-dichlorophenyl (meth)acrylate, 2,4,6-trichlorophenyl (meth)acrylate, 2,3,4,5,6-pentachlorophenyl (meth)acrylate, 2,4-dichlorophenyloxyethyl (meth)acrylate, 2,4,6-trichlorophenyloxyethyl (meth)acrylate, 2,4,6-trichlorophenyl-di(oxyethyl) (meth)acrylate, 2,4,6-trichlorophenoxy-2-methyloxyethyl (meth)acrylate, 3-(2,3,4,5,6-pentabromophenyl)-2-hydroxypropyl (meth)acrylate, 2-phenyl-4-bromphenyl (meth)acrylate, 2-(4-bromopheny)-4,6-dibromophenyl (meth)acrylate, 2-(4-chlorophenyl)- 4,6-dichlorophenyl (meth)acrylate, 2-phenyl-4-bromphenyloxyethyl (meth)acrylate, 2-(4-bromophenyl)-4,6-dibromophenyloxyethyl (meth)acrylate, 2-(2,4,6-tribromophenyl)-4,6-dibromophenyl (meth)acrylate, 2-(2,4-dibromophenyl)-4,6-dibromophenyloxyethyl (meth)acrylate, 1-(4-chloronaphthyl)oxyethyl (meth)acrylate, 2-(4-chloronaphthyl)oxyethyl (meth)acrylate, 1-(4-bromonaphthyl)oxyethyl (meth)acrylate, 2-(4-bromonaphthyl)oxyethyl (meth)acrylate, 3-[1-(2-bromonapthyl)]-2-hydroxypropyl (meth)acrylate and 3-[2-(2-bromonaphthyl)]-2-hydroxypropyl (meth)acrylate.

As the mono(meth)acrylate represented by the general formulae (III), (IV) and (V) in the compositions of the present invention, the above-enumerated compounds may be used alone or in admixture of two or more. However, for the reason that the resulting lenses have high surface accuracy and are colorless and transparent, phenyl (meth)acrylate, benzyl (meth)acrylate, phenoxyethyl (meth)acrylate, 3-phenoxy-2-hydroxypropyl (meth)acrylate, 2-phenylphenyl (meth)acrylate, 4-phenylphenyl (meth)acrylate, 3-(2-phenylphenyl)-2-hydroxypropyl (meth)acrylate, 3-(4-phenylphenyl)-2-hydroxypropyl (meth)acrylate, 1-naphthyloxyethyl (meth)acrylate, 2-naphthyloxyethyl (meth)acrylate, 2,4,6-tribromophenyl (meth)acrylate, 2,4,6-tribromophenoxyethyl (meth)acrylate, 2,4,6-tribromophenyl-di(oxyethyl) (meth)acrylate and 2,4,6-tribromobenzyl (meth)acrylate are preferred.

The compound (D) having at least one polymerizable double bond in the molecule, which constitutes a fourth component in the compositions of the present invention, is a component for imparting thereto high thermal resistance, high surface hardness and low viscosity. In particular, since a highly viscous urethane poly(meth)acrylate or epoxy poly(meth)acrylate is used in the compositions of the present invention, it is preferable to reduce the viscosity of the compositions as much as possible and thereby improve their casting workability. Accordingly, it is especially preferable to use a low-viscosity ester monomer as the compound (D).

Specific examples of the compound (D) include mono(meth)acrylate compounds such as methyl (meth)acrylate, ethyl (meth)acrylate, propyl (meth)acrylate, n-butyl (meth)acrylate, isobutyl (meth)acrylate, tert-butyl (meth)acrylate, pentyl (meth)acrylate, 2-ethylhexyl (meth)acrylate, n-hexyl (meth)acrylate, lauryl (meth)acrylate, stearyl (meth)acrylate, butoxyethyl (meth)acrylate, allyl (meth)acrylate, methallyl (meth)acrylate, glycidyl (meth)acrylate, N,N-dimethylaminoethyl (meth)acrylate, N,N-diethylaminoethyl (meth)acrylate, 2-cyanoethyl (meth)acrylate, dibromopropyl (meth)acrylate, N-vinyl-2-pyrrolidone (meth)acrylate, polyethylene glycol monoalkyl ether (meth)acrylates, polypropylene glycol monoalkyl ether (meth)acrylates, 2-hydroxyethyl (meth)acrylate, 2-hydroxypropyl (meth)acrylate, 2-hydroxybutyl (meth)acrylate, 4-hydroxybutyl (meth)acrylate, tetrahydrofurfuryl (meth)acrylate and phośphoethyl (meth) acrylate; di(meth)acrylates of poly (or mono)ethylene glycols, such as ethylene glycol di(meth)acrylate, diethylene glycol di(meth)acrylate, triethylene glycol di(meth)acrylate, tetraethylene glycol di(meth)acrylate, pentaethylene glycol di(meth)acrylate, and nonaethylene glycol di(meth)acrylate; di(meth)acrylates of poly (or mono)propylene glycols, such as propylene glycol di(meth)acrylate, dipropylene glycol di(meth)acrylate, tripropylene glycol di(meth)acrylate, tetrapropylene glycol di(meth)acrylate and nonapropylene glycol di(meth)acrylate; multifunctional (meth)acrylic compounds such as 1,3-butylene glycol di(meth)acrylate, 1,4-butylene glycol di(meth)acrylate, 1,6-hexamethylene glycol di(meth)acrylate, 1,14-tetradecamethylene glycol di(meth)acrylate, neopentyl glycol di(meth)acrylate, neopentyl glycol hydroxypivalate di(meth)acrylate, the di(meth)acrylate of the adduct of caprolactone with neopentyl glycol hydroxypivalate, neopentyl glycol adipate di(meth)acrylate, dicyclopentenyl di(meth)acrylate, dicyclopentanyl di(meth)acrylate, 2-(2-hydroxy-1,1-dimethylethyl)-5-hydroxymethyl-5-ethyl-1,3-dioxane di(meth)acrylate, trimethylolpropane tri(meth)acrylate, ditrimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, di(meth)acryloyloxyethyl isocyanurate, tris(meth)acryloyloxyethyl isocyanurate, 2,2-bis[4-(meth)acryloyloxyphenyl]propane, 2,2-bis[4-(meth)acryloyloxyethoxyphenyl]propane, 2,2-bis[4-(meth)acryloyloxydiethoxyphenyl]propane, 2,2-bis[4-(meth)acryloyloxypentaethoxyphenyl]propane, 2,2-bis[4-(meth)acryloyloxyethoxy-3,5-dibromophenyl]propane, 2,2-bis[4-(meth)acryloyloxydiethoxy-3,5-dibromophenyl]propane, 2,2-bis[4-(meth)acryloyloxypentaethoxy-3,5-dibromophenyl]propane, 2,2-bis[4-(meth)acryloyloxyethoxy-3,5-dimethylphenyl]propane, 2,2-bis[4-(meth)acryloyloxyethoxy-3-phenylphenyl]propane, bis[4-(meth)acryloyloxyphenyl]sulfone, bis[4-(meth)acryloyloxyethoxyphen-vl]sulfone, bis[4-(meth)acryloyloxydiethoxyphenyl]sulfone, bis[4-(meth)acryloyloxypentaethoxyphenyl]sulfone, bis[4-(meth)acryloyloxyethoxy-3-phenylphenyl]sulfone, bis[4-(meth)acryloyloxyethoxy-3,5-dimethylphenyl]sulfone, bis[4-(meth)acryloyloxyphenyl]sulfide, bis[4-(meth)acryloyloxyethoxyphenyl]sulfide, bis[4-(meth)acryloyloxypentaethoxyphenyl]sulfide, bis[4-(meth)acryloyloxyethoxy-3-phenylphenyl]sulfide, bis[4-(meth)acryloyloxyethoxy-3,5-dimethylphenyl]sulfide, di[(meth)acryloyloxyethoxy]phosphate and tri[(meth)acryloyloxyethoy]phosphate; vinyl compounds such as styrene, vinyltoluene, chlorostyrene, bromostyrene, divinylbenzene, 1-vinylnaphthalene, 2-vinylnaphthalene and N-vinylpyrrolidone; allyl compounds such as diethylene glycol bisallyl carbonate, trimethylolpropane diallyl, diallyl phthalate and dimethallyl phthalate; and (meth)acrylic acid and its metallic salts such as barium, lead, antimony, titanium, tin and zinc (meth)acrylate. These compounds may be used alone or in admixture of two or more.

The compositions for plastic lenses in accordance with the present invention comprise 10 to 60 parts by weight of component (A), 20 to 80 parts by weight of component (B), 5 to 60 parts by weight of component (C), and 0 to 60 parts by weight of component (D), with the total amount of components (A), (B), (C) and (D) being 100 parts by weight. If the amount of component (A) used is less than 10 parts by weight, it will be impossible to impart sufficient impact resistance to the resulting lenses and control their water absorption. On the other hand, if it is greater than 60 parts by weight, the resulting lenses will be reduced in thermal resistance and surface hardness. Preferably, component (A) is used in an amount of 20 to 50 parts by weight. If the amount of component (B) used is less than 20 parts by weight, it will be impossible to impart sufficient thermal resistance to the resulting lenses. On the other hand, if it is greater than 80 parts by weight, the composition will have excessively high viscosity and hence reduced workability in casting operation. Preferably, component (B) is used in an amount of 30 to 60 parts by weight. If the amount of component (C) used is less than 5 parts by weight, the resulting lenses will have low surface accuracy. On the other hand, if it is greater than 60 parts by weight, the resulting lenses will be reduced in thermal resistance and toughness. Preferably, component (C) is used in an amount of 10 to 40 parts by weight. Although component (D) is not an essential component, this is used to further improve the thermal resistance and surface hardness of the resulting lenses and to reduce the viscosity of the composition and thereby improve its casting workability. Preferably, component (B) is used in an amount of 5 to 30 parts by weight.

If desired, the compositions for plastic lenses in accordance with the present invention may further contain various additives such as antioxidants, antiyellowing agents, ultraviolet light absorbers, bluing agents and pigments, so long as they do not impair the effects of the present invention.

The compositions for plastic lenses in accordance with the present invention can be prepared by mixing and stirring components (A), (B), (C) and (D) in the usual manner and incorporating various additives thereinto according to the need.

The compositions for plastic lenses in accordance with the present invention can be cured by means of a polymerization initiator. Useful polymerization initiators include, for example, organic peroxides such as benzoyl peroxide, tert-butyl peroxyisobutyrate and tert-butyl peroxy-2-ethylhexanoate; azo compounds such as 2,2'-azobisisobutyronitrile and 2,2,-azobis(2,4-dimethylvaleronitrile); and photopolymerization initiators such as 2-hydroxy-2-methyl-1-phenylpropan-1-one, methyl phenylglyoxylate and 2,4,6-trimethylbenzoyldiphenylphosphine oxide. These polymerization initiators may be used alone or in admixture of two or more. The amount of polymerization initiator used is generally in the range of 0.005 to 5 parts by weight per 100 parts by weight of the combined amount of components (A), (B), (C) and (D).

Lenses can be made, for example, by use of a mold comprising two mirror-polished glass plates and a gasket formed of an ethylene-vinyl acetate copolymer. A composition of the present invention is poured into the mold and cured either by irradiation with high-energy radiation from one side or both side of the mold, or by the application of heat. A combination of irradiation and heating may also be used. The mold may comprise two glass plates, a glass plate and a plastic plate, a glass plate and a metal plate, or a combination of them. Moreover, the gasket formed of the above-described thermoplastic resin may be replaced by an adhesive tape formed of polyester.

The present invention is further illustrated by the following examples and comparative examples. The abbreviations used for monomers are as follows:
Component (A)
  9BGDM: nonabutylene glycol dimethacrylate.
  12BGDM: dodecabutylene glycol dimethacrylate.
Component (B)
  UDM1: a urethane dimethacrylate obtained by reacting isophorone diisocyanate with 2-hydroxypropyl methacrylate.

UDM2: a urethane dimethacrylate obtained by reacting 1,3-bis($\alpha,\alpha$-dimethylisocyanatomethyl)benzene with 2-hydroxypropyl methacrylate.

UDA3: a urethane diacrylate obtained by reacting tolylene diisocyanate with 2-hydroxyethyl acrylate.

EDM1: an epoxy dimethacrylate obtained by reacting bisphenol A diglycidyl ether with methacrylic acid.

EDA2: an epoxy diacrylate obtained by reacting tetrabromobisphenol A diglycidyl ether with acrylic acid.

EDM3: an epoxy dimethacrylate obtained by reacting bisphenol S diglycidyl ether with methacrylic acid.

Component (C)

TCDM: tricyclo[5.2.1.0$^{2,6}$]decan-8-yl methacrylate.
CHM: cyclohexyl methacrylate.
IBA: isobornyl acrylate.
ADM: adamantyl methacrylate.
PhM: phenyl methacrylate.
BPhM: 2-phenylphenyl methacrylate.
3BrPhM: 2,4,6-tribromophenoxyethyl acrylate.
HPM: 3-phenoxy-2-hydroxypropyl methacrylate.
BzM: benzyl methacrylate.
POM: phenoxyethyl methalcrylate.

Component (D)

HDDM: 1,6-hexamethylene glycol dimethacrylate.
HDDA: 1,6-hexamethylene glycol diacrylate.
DGBC: diethylene glycol bisallyl carbonate.
9EGDM: nonaethylene glycol dimethacrylate.

Synthesis Example 1 (synthesis of 9BGDM by ester interchange)

A 5-liter four-necked flask was charged with 2.0 kg of nonabutylene glycol having an average molecular weight of 680 (commercially available under the trade name of PTG-650SN from Hodogaya Chemicals Co., Ltd.), 2.0 kg of MMA, and 0.5 kg of hydroquinone monomethyl ether. Using 50 g of titanium tetra-n-butoxide as a catalyst, the reaction mixture was stirred at 100°–120° C. for 3 hours, during which time the methanol formed was azeotropically removed with MMA. After completion of the reaction, the excess MMA was distilled off under reduced pressure. The residue was mixed with 1 kg of toluene and washed with alkaline water. Then, the toluene was distilled off under reduced pressure to obtain 9BGDM.

The 9BGDM thus obtained was colorless and transparent. When analyzed by bromine addition, its purity was found to be 100%.

Synthesis Example 2 (synthesis of a urethane dimethacrylate)

A three-necked flask was charged with 222 parts of isophorone diisocyanate and 0.3 part of hydroquinone monomethyl ether. While this mixture was being stirred at 60° C., a mixture of 302 parts of 2-hydroxypropyl methacrylate and 0.3 part of di-n-butyltin laurate was added dropwise thereto over a period of 3 hours. After completion of the addition, the reaction was continued at 70° C. for an additional 8 hours to obtain a urethane dimethacrylate (UDM1).

Synthesis Example 3 (synthesis of an epoxy dimethacrylate)

A 5-liter three-necked flask was charged with 3015 g of bisphenol A diglycidyl ether (commercially available under the trade name of YD-8125 from Toto Kasei Co., Ltd.), 1485 g of methacrylic acid (commercially available from Mitsubishi Rayon Co., Ltd.), 45 g of benzyltrimethylammonium chloride as a catalyst, and 1 g of hydroquinone monomethyl ether as an inhibitor. When this reaction mixture was reacted at 70° C. for 3 hours, at 80° C. for 3 hours, and then at 110° C. for 8 hours, its acid value reached 0.15. The reaction was stopped to obtain an epoxy dimethacrylate (EDM1).

EXAMPLE 1

35 g of 9BGDM, 40 g of UDM1, 20 g of TCDM, 5 g of HDDM, 0.03 g of 2,4,6-trimethylbenzoyldiphenylphosphine oxide, 0.1 g of tert-butyl peroxyisobutyrate, 0.05 g of 2-hydroxy-4-methoxybenzophenone, and 0.2 g of tridodecyl phosphate were mixed and stirred well at room temperature. Then, this mixture was deaerated by exposing it to a reduced pressure of 50 mmHg for 10 minutes.

A mirror-finished glass disk having an external diameter of 80 mm and a curvature of 386 mm, and a mirror-finished glass disk having an external diameter of 80 mm and a curvature of 65 mm were combined so as to give a concave lens having a thickness of 1.5 mm at its center. Then, these glass disks were surrounded by a polyvinyl chloride gasket to form a mold. The above composition was poured into this mold.

Subsequently, using 2 kW high-pressure mercury vapor lamps, both sides of the mold were irradiated with ultraviolet light in an amount of 2000 mJ/cm$^2$, followed by heating at 130° C. for 2 hours. Thereafter, the lens was removed from the mold and annealed by heating at 120° C. for an hour. Lenses made in this manner were evaluated and the results of evaluation are shown in Table 1.

EXAMPLES 2–8

Lenses were made in the same manner as described in Example 1, except that monomers were used in the proportion shown in Table 1. These lenses were evaluated and the results of evaluation are also shown in Table 1.

COMPARATIVE EXAMPLE 1

100 g of diethylene glycol bisallyl carbonate (commercially available under the trade name of CR-39 from PPG Co., Ltd.) and 3 g of diisopropyl peroxypercarbonate were mixed and stirred well. Then, this mixture was poured into the same mold as used in Example 1, and cured by maintaining it at 45° C. for 10 hours, at 60° C. for 3 hours, at 80° C. for 3 hours, and then at 95° for 6 hours. Thereafter, the lens was removed from the mold and annealed by heating at 120° C. for an hour. Lenses and flat disks made in this manner were evaluated and the results of evaluation are shown in Table 1.

COMPARATIVE EXAMPLES 2–8

Lenses were made in the same manner as described in Example 1, except that monomers were used in the proportion shown in Table 1. These lenses were evaluated and the results of evaluation are also shown in Table 1.

EXAMPLES 9–12 AND COMPARATIVE EXAMPLES 9–12

Lenses were made in the same manner as described in Example 1, except that a compound represented by the general formula (III), (IV) or (V) was used as component (C) and monomers were used in the proportion shown in Table 2. These lenses were evaluated and the results of evaluation are also shown in Table 2.

EXAMPLES 13-16 AND COMPARATIVE EXAMPLES 13-16

Lenses were made in the same manner as described in Example 1, except that an epoxy poly(meth)acrylate was used as component (B) and monomers were used in the proportion shown in Table 3. These lenses were evaluated and the results of evaluation are also shown in Table 3.

EXAMPLES 17-22 AND COMPARATIVE EXAMPLES 17-21

Lenses were made in the same manner as described in Example 1, except that an epoxy poly(meth)acrylate was used as component (B), a compound represented by the general formula (III), (IV) or (V) was used as component (C), and monomers were used in the proportion shown in Table 4. These lenses were evaluated and the results of evaluation are also shown in Table 4.

Testing Procedures

The testing procedures employed in the foregoing examples and comparative examples are described below. Test items other than surface accuracy and falling ball test were evaluated by using flat disks having a thickness of 2 mm or 5 mm and an external diameter of 75 mm.

Visible light transmittance (%): This was measured according to ASTM D1003-61.

Refractive index: Using the D line at 589.3 nm, this was measured with an Abbe refractometer.

Saturated water absorption (wt.%): A flat disk having a thickness of 5 mm was allowed to stand in a 100% saturated steam chamber at 70° C. for 3 days. Thereafter, its weight gain was measured.

Falling ball test: A lens having a thickness of 1.5 mm was tested according to the FDA standards. Various steel balls were allowed to fall on the lens from a height of 127 cm, and the test result is expressed by the weight of the largest steel ball which did not crack the lens.

Rockwell hardness: This was measured according to JIS K7202.

Thermal resistance: Using a TMA measuring apparatus, Tg was measured under a load of 10 g.

Surface accuracy: The central part of a lens was examined for distortion with the naked eye and rated on the following basis.

A = No distortion was observed. (The difference between the design curvature and the curvature of the tested lens was 0-1%).

B = Slight distortion was observed. (The difference was 1-3%.)

C = Appreciable distortion was observed. (The difference was 3-5%.)

D = Moderate distortion was observed. (The difference was 5-10%.)

E = Marked distortion was observed. (The difference was 10-20%.)

F = The lens cannot be used. (The difference was greater than 20%.)

Casting workability: Each composition was examined for the ease of pouring into a mold.

O = Easy to pour.

X = Difficult to pour.

Dyeability: 2 g of a dye (commercially available under the trade name of Seiko Plax Diacoat from Hattori Seiko Co., Ltd.) was dispersed in 1 liter of water. Using this dispersion, a flat disk was dyed at 90° C. for 5 minutes and its visible light transmittance was measured.

TABLE 1

| | Component (A) (g) | Component (B) (g) | Component (C) (g) | Component (D) (g) | Visible light transmittance (%) | Refractive index at 20° C. |
|---|---|---|---|---|---|---|
| Example 1 | 9BGDM 35 | UDM1 40 | TCDM 20 | HDDM 5 | 92 | 1.504 |
| Example 2 | 9BGDM 30 | UDM1 45 | CHM 15 | HDDA 10 | 91 | 1.499 |
| Example 3 | 12BGDM 30 | UDM1 40 | IBA 20 | HDDA 10 | 91 | 1.501 |
| Example 4 | 9BGDM 50 | UDM1 30 | TCDM 20 | — | 92 | 1.503 |
| Example 5 | 9BGDM 10 | UDM2 40 | TCDM 50 | — | 91 | 1.525 |
| Example 6 | 9BGDM 30 | UDM2 50 | TCDM 20 | — | 91 | 1.520 |
| Example 7 | 9BGDM 20 | UDM2 70 | TCDM 10 | — | 91 | 1.524 |
| Example 8 | 9BGDM 30 | UDA3 50 | ADM 20 | — | 91 | 1.554 |
| Comparative Example 1 | — | — | — | DGBC 100 | 92 | 1.499 |
| Comparative Example 2 | 9BGDM 40 | — | TCDM 50 | HDDM 10 | 92 | 1.510 |
| Comparative Example 3 | 9BGDM 10 | UDM1 90 | — | — | 90 | 1.501 |
| Comparative Example 4 | 9BGDM 30 | UDM1 50 | — | HDDM 20 | 92 | 1.500 |
| Comparative Example 5 | — | UDM1 50 | TCDM 50 | — | 92 | 1.512 |
| Comparative Example 6 | 9BGDM 70 | UDM1 20 | TCDM 10 | — | 92 | 1.495 |
| Comparative | — | UDM1 | TCDM | 9EGDM 35 | 92 | 1.505 |

TABLE 1-continued

| | | | | | | |
|---|---|---|---|---|---|---|
| Example 7 | | 40 | 20 | HDDM 5 | 92 | 1.507 |
| Comparative Example 8 | 9BGDM 10 | UDM1 20 | TCDM 70 | — | 92 | 1.507 |

| | Saturated water absorption (%) | Falling ball test (g) | Rockwell hardness (M) | Thermal resistance (Tg) | Surface accuracy | Casting workability | Dyeability |
|---|---|---|---|---|---|---|---|
| Example 1 | 1.2 | 24 | 105 | 110 | A | ◯ | 23 |
| Example 2 | 1.3 | 24 | 98 | 102 | A | ◯ | 28 |
| Example 3 | 1.0 | 35 | 95 | 115 | A | ◯ | 25 |
| Example 4 | 1.2 | 22 | 85 | 95 | B | ◯ | 19 |
| Example 5 | 1.0 | 18 | 117 | 98 | A | ◯ | 48 |
| Example 6 | 1.3 | 22 | 103 | 106 | A | ◯ | 27 |
| Example 7 | 1.6 | 22 | 113 | 104 | C | ◯ | 37 |
| Example 8 | 1.2 | 22 | 120 | 119 | B | ◯ | 29 |
| Comparative Example 1 | 2.2 | 24 | 100 | 80 | D | ◯ | 32 |
| Comparative Example 2 | 0.6 | 18 | 60 | 70 | E | ◯ | 21 |
| Comparative Example 3 | 2.4 | 14 | 120 | 105 | D | X | 68 |
| Comparative Example 4 | 2.0 | 14 | 98 | 114 | F | ◯ | 30 |
| Comparative Example 5 | 1.0 | 9 | 121 | 105 | C | ◯ | 89 |
| Comparative Example 6 | 1.2 | 45 | 40 | 45 | D | ◯ | 12 |
| Comparative Example 7 | 3.6 | 14 | 104 | 105 | B | ◯ | 20 |
| Comparative Example 8 | 0.7 | 9 | 110 | 96 | D | ◯ | 61 |

TABLE 2

| | Component (A) (g) | Component (B) (g) | Component (C) (g) | Component (D) (g) | Visible light transmittance (%) | Refractive index at 20° C. |
|---|---|---|---|---|---|---|
| Example 9 | 9BGDM 35 | UDM1 40 | PhM 20 | HDDM 5 | 91 | 1.517 |
| Example 10 | 12BGDM 30 | UDM1 40 | BPhM 20 | HDDA 10 | 90 | 1.522 |
| Example 11 | 9BGDM 30 | UDM2 50 | BzM 20 | — | 91 | 1.529 |
| Example 12 | 9BGDM 30 | UDA3 50 | 3BrPM 20 | — | 90 | 1.565 |
| Comparative Example 9 | 9BGDM 40 | — | PhM 50 | HDDM 10 | 91 | 1.527 |
| Comparative Example 10 | — | UDM1 50 | PhM 50 | — | 91 | 1.531 |
| Comparative Example 11 | — | UDM1 40 | PhM 20 | 9EGDM 35 HDDM 5 | 91 | 1.517 |
| Comparative Example 12 | 9BGDM 10 | UDM1 20 | PhM 70 | — | 90 | 1.545 |

| | Saturated water absorption (%) | Falling ball test (g) | Rockwell hardness (M) | Thermal resistance (Tg) | Surface accuracy | Casting workability | Dyeability |
|---|---|---|---|---|---|---|---|
| Example 9 | 1.2 | 24 | 103 | 108 | A | ◯ | 27 |
| Example 10 | 1.1 | 28 | 98 | 112 | A | ◯ | 28 |
| Example 11 | 1.4 | 24 | 100 | 102 | A | ◯ | 30 |
| Example 12 | 1.1 | 22 | 116 | 115 | B | ◯ | 31 |
| Comparative Example 9 | 1.2 | 16 | 58 | 65 | F | ◯ | 27 |
| Comparative Example 10 | 1.2 | 6 | 111 | 103 | C | ◯ | 90 |
| Comparative Example 11 | 4.1 | 16 | 101 | 103 | B | ◯ | 27 |
| Comparative Example 12 | 1.6 | 6 | 100 | 90 | E | ◯ | 67 |

TABLE 3

| | Component (A) | Component (B) | Component (C) | Component (D) | Visible light transmittance | Refractive index |
|---|---|---|---|---|---|---|

TABLE 3-continued

|  | (g) | (g) | (g) | (g) | (%) | at 20° C. |
|---|---|---|---|---|---|---|
| Example 13 | 9BGDM 35 | EDM1 40 | TCDM 20 | HDDM 5 | 91 | 1.531 |
| Example 14 | 12BGDM 30 | EDM1 40 | IBA 20 | HDDA 10 | 91 | 1.533 |
| Example 15 | 9BGDM 10 | EDA2 40 | TCDM 50 | — | 91 | 1.548 |
| Example 16 | 9BGDM 30 | EDA2 50 | TCDM 20 | — | 91 | 1.550 |
| Comparative Example 13 | 9BGDM 10 | EDM1 90 | — | — | 90 | 1.553 |
| Comparative Example 14 | 9BGDM 30 | EDM1 50 | — | HDDM 20 | 91 | 1.530 |
| Comparative Example 15 | — | EDM1 50 | TCDM 50 | — | 91 | 1.542 |
| Comparative Example 16 | — | EDM1 40 | TCDM 20 | 9EGDM 35 HDDM 5 | 91 | 1.532 |

|  | Saturated water absorption (%) | Falling ball test (g) | Rockwell hardness (M) | Thermal resistance (Tg) | Surface accuracy | Casting workability | Dyeability |
|---|---|---|---|---|---|---|---|
| Example 13 | 1.6 | 22 | 99 | 130 | A | O | 33 |
| Example 14 | 1.4 | 28 | 98 | 135 | A | O | 35 |
| Example 15 | 1.3 | 18 | 122 | 128 | A | O | 55 |
| Example 16 | 1.0 | 20 | 111 | 133 | A | O | 36 |
| Comparative Example 13 | 2.5 | 12 | 108 | 127 | D | X | 74 |
| Comparative Example 14 | 2.4 | 18 | 105 | 136 | F | O | 42 |
| Comparative Example 15 | 2.0 | 9 | 120 | 130 | C | O | 83 |
| Comparative Example 16 | 3.9 | 18 | 104 | 135 | B | O | 29 |

TABLE 4

|  | Component (A) (g) | Component (B) (g) | Component (C) (g) | Component (D) (g) | Visible light transmittance (%) | Refractive index at 20° C. |
|---|---|---|---|---|---|---|
| Example 17 | 9BGDM 35 | EDM1 40 | PhM 20 | HDDM 5 | 91 | 1.538 |
| Example 18 | 9BGDM 30 | EDM1 45 | 3BrPM 15 | HDDA 10 | 90 | 1.545 |
| Example 19 | 12BGDM 30 | EDM1 40 | BPhM 20 | HDDA 10 | 90 | 1.547 |
| Example 20 | 9BGDM 10 | EDA2 40 | HPM 50 | — | 90 | 1.562 |
| Example 21 | 9BGDM 20 | EDA2 70 | POM 10 | — | 90 | 1.573 |
| Example 22 | 9BGDM 30 | EDM3 50 | 3BrPM 20 | — | 90 | 1.556 |
| Comparative Example 17 | — | EDM1 50 | PhM 50 | — | 90 | 1.559 |
| Comparative Example 18 | — | EDM1 40 | PhM 20 | 9EGDM 35 HDDM 5 | 90 | 1.538 |
| Comparative Example 19 | 9BGDM 10 | EDM1 20 | PhM 70 | — | 90 | 1.552 |

|  | Saturated water absorption (%) | Falling ball test (g) | Rockwell hardness (M) | Thermal resistance (Tg) | Surface accuracy | Casting workability | Dyeability |
|---|---|---|---|---|---|---|---|
| Example 17 | 1.6 | 22 | 97 | 127 | A | O | 38 |
| Example 18 | 1.5 | 22 | 105 | 135 | A | O | 41 |
| Example 19 | 1.2 | 28 | 100 | 133 | A | O | 37 |
| Example 20 | 1.6 | 22 | 117 | 122 | A | O | 59 |
| Example 21 | 1.3 | 22 | 125 | 138 | C | O | 46 |
| Example 22 | 1.3 | 22 | 112 | 136 | B | O | 40 |
| Comparative Example 17 | 2.0 | 9 | 124 | 131 | C | O | 85 |
| Comparative Example 18 | 4.2 | 18 | 98 | 132 | B | O | 34 |
| Comparative Example 19 | 1.8 | 6 | 101 | 93 | E | O | 80 |

What is claimed is:

1. A composition for plastic lenses which comprises (A) 10 to 60 parts by weight of a polybutylene glycol di(meth)acrylate represented by the general formula (I):

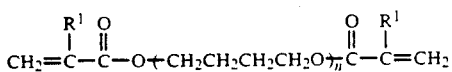

where $R^1$ is hydrogen or methyl, and n is an integer of 5 to 16;

(B) 20 to 80 parts by weight of at least one compound selected from the group consisting of a urethane poly(meth)acrylate having two or more (meth)acryloyloxy groups in the molecule, and an epoxy poly(meth)acrylate having two or more (meth)acryloyloxy groups in the molecule;

(C) 5 to 60 parts by weight of at least one mono(meth)acrylate selected from the group consisting of compounds represented by the general formulae (II), (III), (IV) and (V):

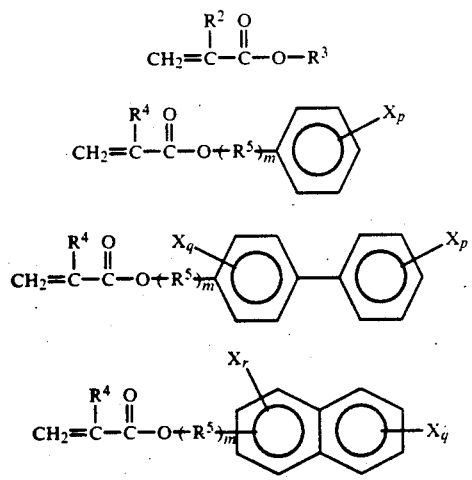

where $R^2$ is hydrogen or methyl, $R^3$ is an alicyclic hydrocarbon radical having 5 to 16 carbon atoms, $R^4$ is hydrogen or methyl, $R^5$ is $-CH_2-$, $-CH_2CH_2-O-$,

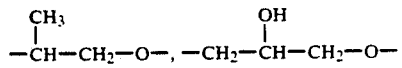

or $-CH_2CH_2CH_2CH_2-O-$, X is chlorine, bromine or iodine, m is an integer of 0 to 3, p is an integer of 0 to 5, q is an integer of 0 to 4, and r is an integer of 0 to 3; and (D) 0 to 60 parts by weight of a compound having at least one polymerizable double bond in the molecule, with the total amount of components (A), (B), (C) and (D) being 100 parts by weight.

2. A composition for plastic lenses as claimed in claim 1 wherein the polybutylene glycol di(meth)acrylate is at least one member selected from the group consisting of heptabutylene glycol di(meth)acrylate, octabutylene glycol di(meth)acrylate, nonabutylene glycol di(meth)acrylate, decabutylene glycol di(meth)acrylate, undecabutylene glycol di(meth)acrylate and dodecabutylene glycol di(meth)acrylate.

3. A composition for plastic lenses as claimed in claim 1 wherein the urethane poly(meth)acrylate having two or more (meth)acryloyloxy groups in the molecule is an adduct of 2-hydroxyethyl (meth)acrylate or 2-hydroxypropyl (meth)acrylate with isophorone diisocyanate, 2,2,4-trimethylhexamethylene diisocyanate, dicyclohexylmethane diisocyanate, xylylene diisocyanate, 1,3-bis(α, α-dimethylisocyanatomethyl)benzene, tolylene diisocyanate or naphthalene diisocyanate.

4. A composition for plastic lenses as claimed in claim 1 wherein the epoxy poly(meth)acrylate having two or more (meth)acryloyloxy groups in the molecule is a reaction product of acrylic acid or methacrylic acid with 1,6-hexanediol diglycidyl ether, diethylene glycol diglycidyl ether, trimethylolpropane diglycidyl ether, trimethylolpropane triglycidyl ether, glycerol diglycidyl ether, glycerol triglycidyl ether, triglycidyl ether of tris(2-hydroxyethyl) isocyanurate, 2,2-bis(4-glycidyloxycyclohexyl)propane, 2,2-bis(4-glycidyloxyphenyl)propane, 2,2-bis(4-glycidyloxyphenyl)sulfone or 2,2-bis(4-glycidyloxy-3,5-dibromophenyl)propane.

5. A composition for plastic lenses as claimed in claim 1 wherein the mono(meth)acrylate is at least one member selected from the group consisting of cyclohexyl (meth)acrylate, norbornyl (meth)acrylate, isobornyl (meth)acrylate, tricyclo[5.2.1.0$^{2,6}$]decan-8-yl (meth)acrylate, phenyl (meth)acrylate, benzyl (meth)acrylate, phenoxyethyl (meth)acrylate, -phenoxy-2-hydroxypropyl (meth)acrylate, 2-phenylphenyl (meth)acrylate, 4-phenylphenyl (meth)acrylate, 3-(2-phenylphenyl)-2-hydroxypropyl (meth)acrylate, 3-(4-phenylphenyl)-2-hydroxypropyl (meth)acrylate, 1-naphthyloxyethyl (meth)acrylate, 2-naphthyloxyethyl (meth)acrylate, 2,4,6-tribromophenyl (meth)acrylate, 2,4,6-tribromophenoxyethyl (meth)acrylate, 2,4,6-tribromophenyl-di(oxyethyl) (meth)acrylate and 2,4,6-tribromobenzyl (meth)acrylate.

6. A composition for plastic lenses as claimed in claim 1 which comprises (A) 20 to 50 parts by weight of at least one polybutylene glycol di(meth)acrylate selected from the group consisting of octabutylene glycol di(meth)acrylate, nonabutylene glycol di(meth)acrylate and decabutylene glycol di(meth)acrylate;

(B) 30 to 60 parts by weight of a urethane poly(meth)acrylate having two or more (meth)acryloyloxy groups in the molecule that is an adduct of 2-hydroxypropyl (meth)acrylate with isophorone diisocyanate, dicyclohexylmethane diisocyanate, xylylene diisocyanate, 1,3-bis(α,α-dimethylisocyanatomethyl)benzene or tolylene diisocyanate;

(C) 10 to 40 parts by weight of at least one compound selected from the group consisting of isobornyl (meth)acrylate, norbornyl (meth)acrylate, tricyclo[5.2.1.0$^{2,6}$]decan-8-yl (meth)acrylate, phenyl (meth)acrylate, benzyl (meth)acrylate, 2-phenylphenyl (meth)acrylate, 3-(2-phenylphenyl)-2-hydroxypropyl (meth)acrylate and 2,4,6-tribromophenoxyethyl (meth)acrylate; and (D) 5 to 30 parts by weight of at least one compound selected from the group consisting of 1,6-hexamethylene di(meth)acrylate, dicyclopentanyl di(meth)acrylate, trimethylolpropane tri(meth)acrylate, 2,2-bis[4-(meth)acryloyloxyethoxyphenyl]propane, 2,2-bis[4-(meth)acryloyloxydiethoxyphenyl]propane, 2,2-bis[4-(meth)acryloyloxyethoxy-3,5-dibromophenyl]propane, 2,2-bis[4-(meth)acryloyloxyethoxyphenyl]sulfone, 2,2-bis[4-

(meth)acryloyloxyethoxyphenyl]sulfide, styrene, divinylbenzene, diethylene glycol bisallyl carbonate and diallyl phthalate.

7. A composition for plastic lenses as claimed in claim 1 which further contains 0.005 to 5 parts by weight of a polymerization initiator.

8. A composition for plastic lenses as claimed in claim 1 which further contains 0.005 to 0.1 part by weight of a polymerization initiator.

* * * * *